United States Patent [19]

Knopp et al.

[11] Patent Number: 4,816,134
[45] Date of Patent: Mar. 28, 1989

[54] PASSIVATION OF METAL CONTAMINATED CRACKING CATALYSTS

[75] Inventors: Kelly G. Knopp; Allen S. Lasater, both of Columbia, Tex.

[73] Assignee: Phillips Petroleum Company, Bartlesville, Okla.

[21] Appl. No.: 908,074

[22] Filed: Sep. 16, 1986

[51] Int. Cl.$^4$ .............................................. C10G 11/06
[52] U.S. Cl. .................................... 208/113; 208/157; 502/22; 502/23
[58] Field of Search .............. 208/113, 146, 153, 157, 208/158, 78; 422/140, 144; 502/22–24

[56] References Cited

U.S. PATENT DOCUMENTS

| | | | |
|---|---|---|---|
| 3,152,065 | 10/1964 | Sharp et al. | 208/153 |
| 4,148,712 | 4/1979 | Nielsen et al. | 208/114 X |
| 4,153,536 | 5/1979 | McKay | 208/114 X |
| 4,289,008 | 9/1981 | McArthur | 208/121 |
| 4,321,128 | 3/1982 | Yoo | 208/114 |
| 4,427,537 | 1/1984 | Dean et al. | 208/153 X |
| 4,434,049 | 2/1984 | Dean et al. | 208/153 |
| 4,459,203 | 7/1984 | Beech et al. | 208/113 |
| 4,555,328 | 11/1985 | Krambeck et al. | 208/113 X |

OTHER PUBLICATIONS

Ametek Steam Jet Syphon (product brochure), 1982, distributed by: Shutte and Koerting (STK) Division of Ametek Inc.

Primary Examiner—Glenn Caldarola
Attorney, Agent, or Firm—Paul S. Chirgott

[57] ABSTRACT

This invention provides a nozzle for discharging a relatively small amount of a metals passivating agent into a catalytic cracking unit at a relatively high velocity through a relatively large diameter opening. This invention further provides a process for discharging a relatively small amount of a metals passivating agent into a high-temperature zone of a catalytic cracking unit, wherein the temperature range of the high-temperature zone exceeds the melting point of the particular passivating agent, through the utilization of a metals passivating agent injection nozzle which disperses the passivating agent, prior to discharging the agent into a catalytic cracking system, and accelerates this dispersed metals passivating agent to a maximum discharge velocity by injecting a dispersing agent into the novel nozzle at a location behind that at which the passivating agent is injected, and then discharging the dispersed metals passivating agent at a relatively high velocity through a passage having a relatively large inside diameter.

17 Claims, 2 Drawing Sheets

PASSIVATION OF METAL CONTAMINATED CRACKING CATALYSTS

The present invention relates to the art of catalytic cracking of hydrocarbons. Particularly, the invention relates to the restoration of cracking catalysts which have contacted a hydrocarbon feedstock. More particularly, the invention relates to the passivation of contaminating metals, deposited onto cracking catalysts which have contacted a hydrocarbon feedstock, through the utilization of passivating agents.

Background of the Invention

Fossil fuels are one of the world's leading sources of energy. However, known oil reserves are finite; therefore, there exists a need to improve the process for converting crude oil into usable petroleum products.

The rising demand for oil and oil products has led to the conversion of higher molecular weight crude oils into these desired products. One method of accomplishing this conversion is by reducing the molecular weight of these heavy crude oils. One principal method utilized in reducing the molecular weight of hydrocarbons is referred to as "catalytic cracking". Generally, with this method, hydrocarbon feedstocks containing higher molecular weight hydrocarbons have their molecular weight reduced (i.e. "cracked") by being contacted under elevated temperatures with a cracking catalyst thereby producing light distillates such as gasoline.

In the catalytic cracking of hydrocarbon feedstocks, particularly heavy feedstocks, metals such as nickel, vanadium, iron, copper and/or cobalt, present in the feedstocks, become deposited on the cracking catalyst promoting excessive hydrogen and coke formations. Since the production of hydrogen and coke generally has an adverse effect on the production of usable products, these are undesirable products of a cracking process. Although the cracking catalyst does undergo a regeneration process, the metal contaminants, which cause the excessive formation of hydrogen and coke, are not removed by a catalyst-regeneration operation. Therefore, there exists a need to mitigate the adverse effects of contaminating metals on cracking catalysts.

One method of mitigating some of the adverse effects is through a process called metals passivation. As used hereinafter, the term "passivation (metals passivation)" is defined as a method for decreasing the detrimental catalytic effects of metal contaminants such as nickel, vanadium, iron, copper and/or cobalt which become deposited on the cracking catalyst during a catalytic cracking process. Therefore, by passivating the contaminating metal deposits on cracking catalysts, the catalysts' life and desired product yields can be prolonged and increased respectively.

It is known that some of the metal deposits which contaminate cracking catalysts can be passivated by contacting the contaminated catalyst with various metals passivating compounds. Conventionally, metals passivating agents are dispersed into the hydrocarbon cracking zone of a catalytic cracking unit which includes the hydrocarbon cracking reactor and the hydrocarbon feedstream conduit. The conventional method of dispersing these metals passivating agents into the hydrocarbon cracking zone has been to either use a tubular conduit which opens into the sidewall of the catalytic cracking unit or to use a quill which extends through the sidewall of a catalytic cracking unit and into the desired point of dispersion. In comparison to the amount of cracking catalyst and hydrocarbon feedstock flowing through a catalytic cracking unit, a relatively small amount of metals passivating agent is required in conventional catalytic cracking processes. In order to avoid problems, such as the backflowing of catalyst and/or hydrocarbons into the passivating injection means, this small amount of metals passivating agent must be injected at a relatively high velocity. Consequently, the inside diameter of the passage through which metals passivating agents have been conventionally injected into the hydrocarbon cracking zone are generally relatively small (i.e. ranging from about ⅛ inch to about ½ inch).

While these conventional injection methods have proven to be effective in the past, there exist many inherent limitations with their use. One such limitation is their inability to effectively discharge a metals passivating agent into a high-temperature zone of a catalytic cracking system. As used herein, a "high-temperature zone" of a catalyst cracking system refers to any zone of the system wherein the temperature range of that zone exceeds the melting point of the particular passivating agent injected therein. The reason such a limitation exists is based on the physical conditions observed at the high-temperature zone and the physical characteristics of the selected metals passivating agent and/or dispersing agent. For instance, as the temperature at the point of injection reaches and/or exceeds the melting point of the selected metals passivation agent, the agent will begin to melt at, or before, the point of injection and solidify within the cooler portion of the passivating agent injection means; thus inevitably clogging the small-diametered injection means through which the agent is injected. It may be assumed that this clogging problem can be overcome by increasing the velocity of the metals passivating agent as it is injected into the particular high-temperature zone. This assumption is erroneous, however, since, as mentioned earlier, the amount of metals passivating agent used for a particular conventional catalytic cracking system is generally constant and relatively small. Therefore, if the velocity of this relatively small amount of metals passivating agent is to be increased, the diameter of the injection means must be decreased. Since the conventional injection methods discharge the metals passivating agent through an opening generally ranging from about ⅛ inch to about ½ inch, it is believed that the results from increasing the velocity of the metals passivating agent will be negated by the results from decreasing the inside diameter through which the metals passivating agent is injected. Therefore, one object of this invention is to provide a novel nozzle for discharging a relatively small amount of a metals passivating agent into a catalytic cracking unit at a relatively high velocity through a relatively large diameter opening. Another object of this invention is to provide, for a catalytic cracking system utilizing metals passivating agents, an improvement comprising a means for efficiently discharging a relatively small amount of a metals passivating agent into a high-temperature zone of a catalytic cracking unit.

SUMMARY OF THE INVENTION

In one aspect, this invention provides, among other things, a novel nozzle for discharging a relatively small amount of a metals passivating agent into a catalytic cracking unit at a relatively high velocity through a relatively large diameter opening. Furthermore, this invention also provides a novel process for efficiently discharging a relatively small amount of a metals passivating agent into a high-temperature zone of a catalytic cracking unit, wherein the temperature range of the high-temperature zone exceeds the melting point of the particular passivating agent, through the utilization of a novel metals passivating agent injection nozzle which disperses the passivating agent, prior to discharging the agent into a catalytic cracking system, and accelerates this dispersed metals passivating agent to a maximum at a location behind that at which the passivating agent is injected, and then discharging the dispersed metals passivating agent at a relatively high velocity through a passage having a relatively large inside diameter.

Further objects, embodiments, advantages, features and details of this invention will become apparent to those skilled in the art from the following detailed description of the invention and the appended claims, as well as a description of the drawings which are briefly described as follows.

DETAILED DESCRIPTION OF THE INVENTION

Figure 1:
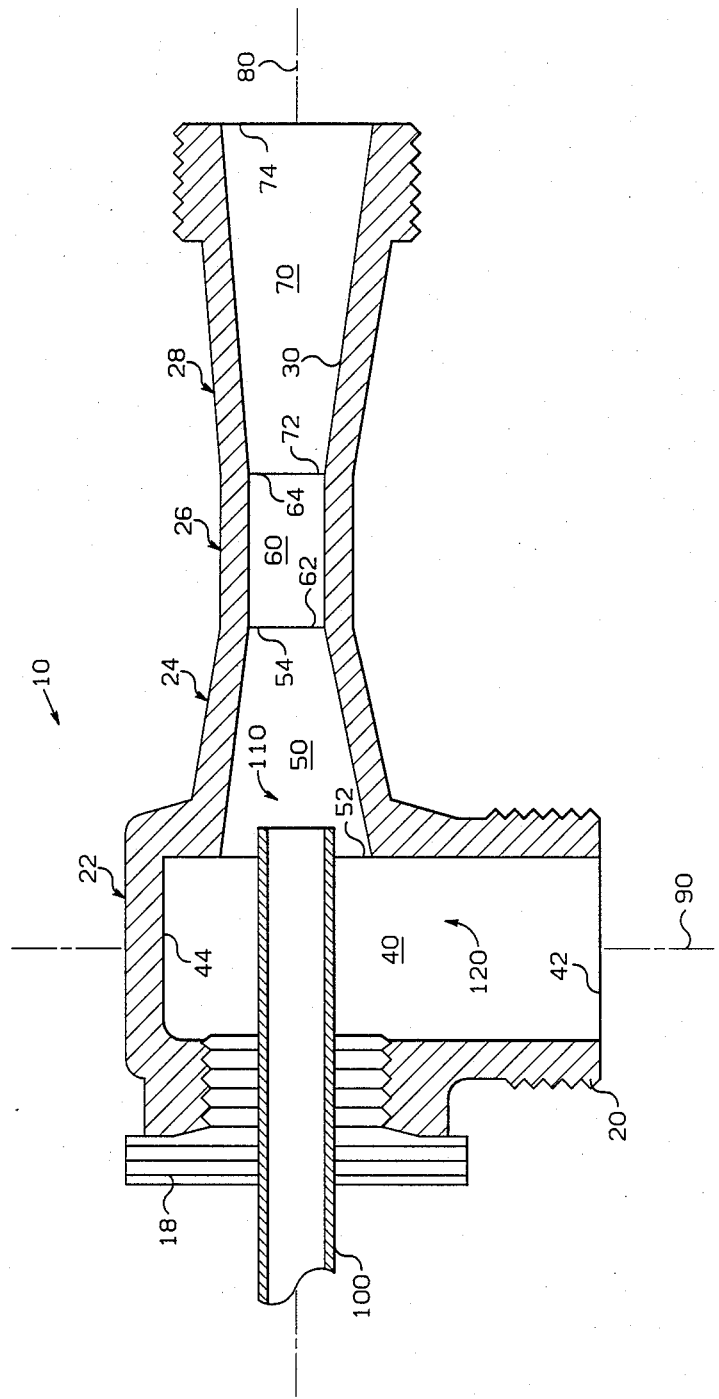
FIG. 1 is a diagrammatic illustration of a novel metals passivating agent injection nozzle.
Figure 2:
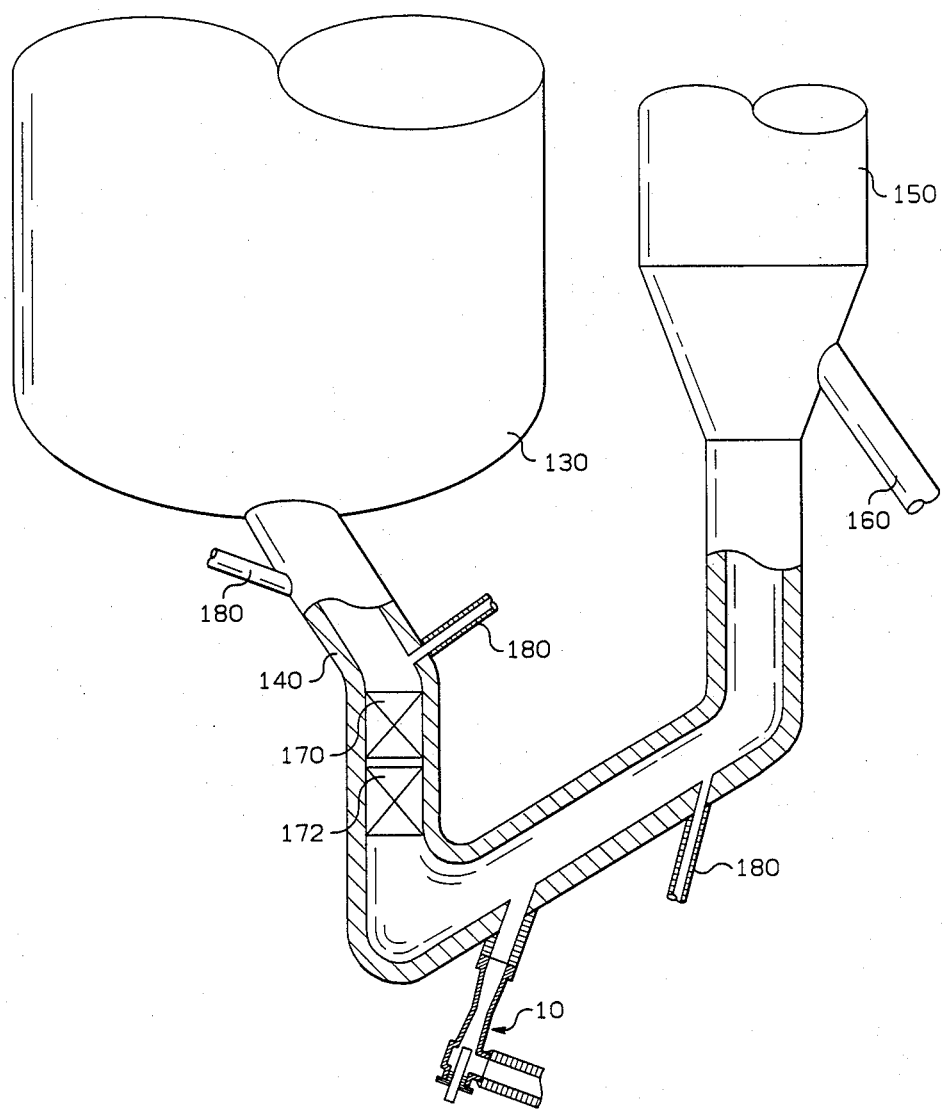
FIG. 2 is a diagrammatic illustration of a portion of a high-temperature zone of a catalytic cracking system utilizing the novel metals passivating agent injection nozzle of this invention.

In accordance with this disclosure, the term "cracking catalyst" refers to any catalytic cracking material which may be suitable for cracking hydrocarbons. In practicing the embodiments of this invention, any suitable cracking catalyst may be utilized. If desired, the cracking catalyst can contain a combustion promoter such as platinum or chromium.

As used herein, a "used (contaminated) cracking catalyst" refers to any cracking catalyst which has contacted a hydrocarbon feedstock and, thus, contains contaminating metals therein or thereon.

A "metals passivation (process)" as used herein refers to a procedure conducted in a catalytic cracking unit wherein adverse effects, caused by contaminating metal deposits from the feedstock being deposited onto the cracking catalyst, are precluded or mitigated by the utilization of a metals passivating agent. Conventional methods of metals passivation have been either to use a small diameter pipe or quill and discharge the passivating agents into the hydrocarbon feedstream or the hydrocarbon cracking reactor.

As used herein, a "(metals) passivating agent" refers to any suitable composition which has the ability to passivate contaminating metals in or on cracking catalysts without substantially hindering the cracking activity of the catalyst. Conventionally, metals passivating agents comprise antimony, due in part to its proven effectiveness and commercial availability.

The term "antimony", as used in this disclosure, refers to any suitable antimony source which is either itself an oxide or is convertible to an oxide. Examples of suitable antimony sources include, but are not limited to, antimony trioxide, antimony tetroxide, antimony pentoxide and the like. Mixtures of any two or more suitable antimony sources can be employed. These antimony-containing metals passivating agents can be dispersed into a catalytic cracking unit while either in a solid or a liquid phase.

Moreover, the term "catalytic cracking unit (system)", as used in this invention, refers to any hydrocarbon cracking unit wherein contaminating metals, deposited in or on the cracking catalyst, are passivated by discharging any metals passivating agent into or onto the contaminated catalyst. The embodiments of this invention are applicable to any suitable catalytic cracking unit using cracking catalysts. Examples of such suitable catalytic cracking units include, but are not limited to, Thermofor Catalytic Cracking Units (TCCU), Heavy Oil Cracking units (HOC) and Fluid Catalytic Cracking Units (FCCU). Broadly, all of the aforementioned cracking units comprise a hydrocarbon cracking reaction zone and a catalyst regeneration zone.

As used herein, the phrase, "hydrocarbon cracking zone (cycle)", refers to that portion of a hydrocarbon cracking unit pertaining to the catalytic cracking of high molecular weight feedstocks. Generally, the hydrocarbon cracking zone includes all points between that at which the hydrocarhon feedstock enters the catalytic cracking unit and that at which the used cracking catalyst exits the hydrocarbon cracking reactor.

Conversely, the phrase, "catalyst regeneration zone (cycle)", as used herein refers to that portion of a hydrocarbon cracking unit pertaining to the regeneration of cracking catalysts. Generally, the catalyst regeneration zone includes all points between that at which the used cracking catalyst exits the hydrocarbon cracking reactor and that at which the hydrocarbon feedstock enters the catalytic cracking unit.

The specific conditions of a hydrocarbon cracking zone and a catalyst regeneration zone are not critical and depend upon several parameters such as the feedstock used, the type and efficiency of the catalytic cracking unit, the cracking catalyst used, and/or the desired results. Commonly, however, the conditions of the cracking and regeneration zones are within the following ranges:

| Hydrocarbon Cracking Zone | |
|---|---|
| Temperature: | 800°–1200° F., (427°–649° C.). |
| Time: | 1–40 seconds. |
| Pressure: | Atmospheric to 50 p.s.i.a.[1] |
| Catalyst:oil ratio | 3:1 to 30:1 by weight. |
| Catalyst Regeneration Zone | |
| Temperature: | 1000°–1500° F., (538°–816° C.). |
| Time: | 2–40 minutes. |
| Pressure: | Atmospheric to 50 p.s.i.a. |
| Air at 60° F. (16° C.) | 100–250 ft$^3$/lb coke, |
| and at 1 atmosphere: | (6.2–15.6 m$^3$/kg coke). |

[1]The abbreviation p.s.i.a. refers to a standard measurement of pressure (i.e. pounds per square inch absolute).

In accordance with one aspect, this invention provides an improved method of discharging any suitable metals passivating agent into either the hydrocarbon cracking zone or the catalyst regeneration zone of a catalytic cracking unit. Specifically, the improvement comprises the use of a novel passivating agent injection nozzle which accelerates a passivating agent to a maximum velocity by dispersing the passivating agent, through the injection of a dispersing agent into the novel nozzle at a location behind that at which the passivating agent is injected and discharges the dispersed passivating agent into a suitable location of a catalytic cracking system. Consequently, this novel nozzle discharges a dispersed passivating agent through a passage having a relatively large inside diameter after accelerating it to a maximum discharge velocity. The use of this novel metals passivating agent injection nozzle has inherent advantages over conventional injection methods. One such advantage is that the novel injection nozzle described herein can efficiently discharge metals passivating agents into a high-temperature zone of a catalytic cracking system.

Generally, the passivating agent injection nozzle (hereinafter referred to as injection nozzle) of this invention, having an upstream end portion and a downstream end portion, wherein the downstream end opens into a sidewall of a catalytic cracking unit, comprises four major zones. First, the injection nozzle comprises a dispersing agent inlet zone wherein any suitable dispersing agent is injected into the upstream end portion of the defined cavity within the hody of the novel injection nozzle. The nozzle also comprises a passivating agent inlet zone, wherein any suitable passivating agent is injected into the defined cavity within the body of the injection nozzle at a point, however, which is downstream of the dispersing agent inlet zone. This location of injecting the passivating agent into the nozzle is critical for accelerating the passivating agent to a maximum discharge velocity. The term "discharge velocity" as used herein refers to the velocity of a particular medium while flowing along the same longitudinal axis as the nozzle discharge end opening into a catalytic cracking unit.

The injection nozzle further comprises a passivating agent dispersion zone wherein the selected dispersing agent disperses and accelerates the selected passivating agent to a maximum discharge velocity by combining with the passivating agent after the dispersing agent has achieved its maximum discharge velocity. Finally, the nozzle comprises a discharging zone wherein the dispersed passivating agent, which has been accelerated to a maximum discharge velocity, is discharged into any suitable location of a catalytic cracking system.

Referring now to FIG. 1, there is shown a cross sectional view of a preferred metals passivating agent injection nozzle generally at 10. Injection nozzle 10 includes a shell member 20 having an inside wall surface 30 which defines a cavity and various passages (i.e. chambers) therein which are hereinafter described. Shell member 20 includes sections 22, 24, 26 and 28.

As shown in FIG. 1, one end of section 22 is partially closed off by means of screw flange 18. The inside wall surface 30 of shell member 20 and screw flange 18 define within section 22 a generally cylindrical chamber 40 having an upstream end 42 and a downstream end 44.

The inside wall surface 30 of shell member 20 defines within section 24 a generally frustoconical chamber 50 having an upstream end 52 and a downstream end 54. The upstream end 52 of frustoconical chamber 50 has a larger inside diameter measurement than the downstream end 54 of frustoconical chamber 50.

The inside wall surface 30 of shell member 20 defines within section 26 a generally cylindrical chamber 60 having an upstream end 62 and a downstream end 64. The upstream end 62 of cylindrical chamber 60 has the same inside diameter measurement as the downstream end 54 of frustoconical chamber 50.

The inside wall surface 30 of shell member 20 defines within section 28 a generally frustoconical chamber 70 having an upstream end 72 and a downstream end 74. The upstream end 72 of frustoconical chamber 70 has the same inside diameter measurement as the downstream end 64 of cylindrical chamber 60. Furthermore, the downstream end 74 of frustoconical chamber 70 has a larger inside diameter measurement than the upstream end 72 of frustoconical chamber 70.

Chambers 50, 60 and 70 of shell member 20 all lie on longitudinal axis 80. Chamber 40 of shell member 20 lies on longitudinal axis 90. Longitudinal axis 80 is generally perpendicular to longitudinal axis 90.

The chambers 40, 50, 60 and 70 of sections 22, 24, 26 and 28, respectively, are interconnected to one another as follows. The downstream end 44 of cylindrical chamber 40 opens into the upstream end 52 of frustoconical chamber 50. Frustoconical chamber 50 converges from its upstream end 52 to its downstream end 54 which opens into the upstream end 62 of cylindrical chamber 60. The downstream end 64 of cylindrical chamber 60 opens into the upstream end 72 of frustoconical chamber 70 which diverges to its downstream end 74.

A metals passivating agent inlet conduit 100 extends through screw flange 18, through chamber 40 of section 26 and opens into the frustoconical chamber 50 of section 24. As shown in FIG. 1, passivating agent inlet conduit 100 is generally aligned on longitudinal axis 80 and opens beyond the upstream end 52 of frustoconical chamber 50. As explained earlier, it is critical, when practicing the embodiments of this invention, to have the passivating agent inlet conduit open downstream from the upstream end 52 of chamber 50.

The novel injection nozzle 10 illustrated in FIG. 1 discharges a metals passivating agent as follows. The dispersing agent is injected into the dispersing agent inlet zone 120, located within chamber 40 of section 22. The selected dispersing agent can be injected into inlet zone 120 under any suitable pressure. Preferably, the dispersing agent is injected under a pressure ranging from about 30 p.s.i.a. to about 150 p.s.i.a. Chamber 40 may have any suitable configuration. Preferably, chamber 40 is cylindrical and has an inside diameter ranging from about ½ inch to about 1½ inches. Once injected into nozzle 10, the dispersing agent travels from chamber 40 of section 22 through the upstream end 52 of chamber 50, and is eventually discharged through the downstream end 74 of chamber 70. In the embodiment illustrated in FIG. 1, the dispersing agent is at its maximum discharge velocity as it enters the upstream end 52 of chamber 50 since that is the point at which the eniire flow of the dispersing agent is concentrated along the same longitudinal axis as the discharge end portion opening oi the novel injection nozzle.

The passivating agent is injected into the passivating agent inlet zone 110 through passivating agent inlet conduit 100 which opens beyond the upstream end 52 of chamber 50 of section 24 and downstream of the dispersing agent inlet zone 120. The selected passivating agent may be injected into chamber 50 under any suitable pressure. In fact, due to the unique design of the novel injection nozzle disclosed herein, a suitable metals passivating agent may not require the need of any injection pressure. For example, the rapid movement of the dispersing agent through chambers 50, 60 and 70 results in a lowering of the ambient pressure within these chambers; thus drawing, by means of sucking action, the selected metals passivating agent through conduit 100 into the passivating agent inlet zone 110. Preferably, however, the metals passivating agent is injected under a pressure ranging from about 20 p.s.i.a. to about 100 p.s.i.a. Passivating agent inlet conduit 100 may have any suitable configuration. Preferably, conduit 100 is cylindrical and has an inside diameter ranging from about ⅛ inch to about ½ inch. As shown in FIG. 1, the dispersing agent inlet zone 120 is upstream from the passivating agent inlet zone 110. As stated earlier, in order to accelerate the dispersed passivating agent to a maximum discharge velocity, the dispersing agent must contact the passivating agent after the dispersing agent has achieved its maximum discharge velocity. Therefore, the relative injection location of the dispersing and passivating agents disclosed herein is a critical feature when practicing the embodiments of this invention.

After the dispersing agent has achieved its maximum discharge velocity, it combines with the passivating agent, which achieves its maximum discharge velocity as it exits the passivating agent inlet conduit, within chambers 50, 60 and 70 of sections 24, 26 and 28 respectively, to form a dispersed passivating agent mixture. As this dispersed passivating mixture travels through chambers 50, 60 and 70, its velocity is accelerated. When the dispersed passivating mixture is discharged from injection nozzle 10 through the downstream end 74 of chamber 70 it is traveling at its maximum discharge velocity. The downstream end 74 of chamber 70 may have any suitable inside diameter measurement. Preferably, the inside diameter of the downstream end 74 of chamber 70 ranges from about ¾ inch to about 2½ inches.

Chambers 50, 60 and 70 of sections 24, 26 and 28, respectively, may have any suitable configuration. Examples of suitable chamber configurations include, but are not limited to, frustoconical and/or cylindrical configurations. Preferably, chamber 50 converges from its upstream end 52 to its downstream end 54. The downstream end 54 of chamber 50 is in fluid communication with the upstream end 62 of chamber 60. Preferably, chamber 60 is generally cylindrical. The downstream end 64 of chamber 60 opens into the upstream end 72 of chamber 70 which, preferably, diverges to its downstream end 74.

The pressure under which the dispersed passivating agent is injected from nozzle 10 is not critical. Generally, the pressure required to efficiently discharge the dispersed passivating agent depends upon many variables. Examples of such variables include, but are not limited to, the conditions at the particular point within the catalytic cracking system at which the dispersed passivating agent is to be injected and the chemical and/or physical properties of the passivating agent and/or dispersing agent. If the novel injection nozzle is used for discharging a dispersed passivating agent into a high-temperature zone of a catalytic cracking unit, the dispersed passivating agent is preferably discharged from nozzle 10 under a pressure ranging from about 20 p.s.i.a. to about 150 p.s.i.a.

In a further embodiment, this invention also provides an improved catalytic cracking process and apparatus. The improvement comprises the incorporation of the novel injection nozzle disclosed above into a catalytic cracking unit. Among other advantages, the incorporation of the novel injection nozzle enables the effective discharging of metals passivating agents into a high-temperature zone of the catalytic cracking unit. This improved process is not limited to any particular type of catalytic cracking unit.

When practicing the improved hydrocarbon cracking process of this invention, the form in which a metals passivating agent is used is not critical. In other words, the metals passivating agent may be either in a solid or liquid phase. Examples of preferred metals passivating agents include, but are not limited to, tris(hydroxyethylmercaptide) commercially available as Phil-Ad CA 3000, aqueous suspensions of antimony trioxide, aqueous suspensions of antimony pentoxide and/or solid antimony trioxide.

The form in which the dispersing agent is used is also not critical. In other words, the dispersing agent may be either a liquid, vapor and/or gas. Examples of preferred dispersing agents include, but are not limited to, inert gases, water, oil, steam and/or air.

The point at which the novel injection nozzle discharges the dispersed passivating agent is not critical. In other words, the location in which the novel injection nozzle discharges the dispersed passivating agent need not have a temperature range which exceeds the melting point of the selected metals passivating agent. However, in accordance with an embodiment of this invention, the nozzle shows definite advantages over conventional injection methods when used for discharging metals passivating agents into a high-temperature zone of a catalytic cracking unit. Preferably, since the catalyst regeneration cycle of conventional catalytic cracking units has associated therewith the highest temperature ranges encountered in such units, one advantage of using the novel injection nozzle disclosed herein over conventional injection means will be realized when such a nozzle is used for discharging a passivating agent into the catalyst regeneration cycle of a catalytic cracking unit.

Referring now to FIG. 2, a portion of an improved catalytic cracking process apparatus is illustrated. Specifically, the improved catalytic cracking process proceeds as follows. Regenerated catalyst flows from catalyst regenerator 130 into catalyst standpipe 140 while hydrocarbon feedstock flows into hydrocarbon cracking reactor 150 through conduit 160. Slide valves 170 and 172 located within standpipe 140 control the amount of regenerated catalyst needed to achieve a predetermined temperature within hydrocarbon cracking reactor 150 which corresponds to a desired catalyst-to-oil ratio. Throughout standpipe 140 are located a plurality of catalyst aeration nozzles 180 (only three of which are shown), for directing the flow of catalyst toward hydrocarbon cracking reactor 150. After slide valves 170 and 172, but before cracking reactor 150, the novel injection nozzle 10 of this invention discharges a dispersed metals passivating agent at a maximum discharge velocity into catalyst standpipe 140.

The following example will illustrate an embodiment for carrying out one aspect of this invention. However, this example is not to be construed as limiting the invention to the specifics involved therein.

EXAMPLE

This example will illustrate an improved catalytic cracking process and apparatus wherein a metals passivating agent was discharged into a high-temperature zone of a catalytic cracking unit through the use of a novel metals passivating injection nozzle. The results of this example were observed at Phillips Petroleum Company's Sweeny, Texas refinery (hereinafter refered to as Sweeny refinery). The improvement to the catalytic cracking unit at the Sweeny refinery was similar to that illustrated in FIG. 2 of this application. Referring specifically to FIG. 2, the point at which the passivating agent was injected at the Sweeny refinery was catalyst standpipe 140, between the catalyst regenerator 100 and the hydrocarbon cracking reactor 150. The temperature range of this portion of the catalyst regeneration cycle ranged from about 1250° F. to about 1310° F.

In this example, the dispersing agent used was steam and the passivating agent used was an aqueous suspension of antimony trioxide. According to the CRC Handbook of Chemistry and Physics, antimony trioxide has a melting point of 1213° F.

It was believed that, to efficiently discharge the antimony trioxide-containing passivating agent into a high-temperature zone of a catalytic cracking unit, the passivating agent must be discharged through a relatively large diameter opening while traveling at a relatively high velocity. Since, as the discharge velocity of the dispersed passivating agent increases the problem of clogging decreases, an efficient injection process will be that at which the passivating agent is discharged into the high-temperature zone after it has been accelerated to its maximum discharge velocity.

A Penberthy Liquid Jet Pump was acquired and modified for use as an efficient means of discharging a metals passivating agent, at a maximum discharge velocity, through a relatively large diameter opening, into a catalytic cracking unit while the passivating agent is traveling at a maximum velocity. The modifications to the conventional jet pump were required since, as supplied by the manufacturer, the jet pump would not discharge the passivating agent at the desired maximum discharge velocity. For example, as supplied, the jet pump has an inlet conduit, through which a dispersing agent can be injected. Furthermore, as supplied, the jet pump has another inlet conduit through which a passivating agent can be injected. The longitudinal axis of the jet pump conduit through which a metals passivating agent can be injected, is generally perpendicular to the longitudinal axis of the jet pump conduit through which a dispersing agent can be injected. The jet pump conduit through which the passivating agent can be injected lies along the same longitudinal axis through which the dispersed passivating agent is discharged into the catalytic cracking unit and opens into the pump cavity at a point upstream from that at which the conduit, through which a dispersing unit can be injected, opens into the pump cavity. If this jet pump was incorporated, as supplied, the dispersing agent would contact the passivating agent while the dispersing agent was flowing in a perpendicular direction to the flow of the passivating agent. Thus, at the initial point at which the dispersing agent would contact the passivating agent, the relative discharge velocity of the dispersing agent would be approximately zero. This would result in obstructing the flow of the passivating agent from its inlet conduit and, consequently, precluding the dispersed passivating agent from being discharged into the catalyst standpipe at its maximum discharge velocity. To overcome this anticipated problem, modifications were made to the nozzle similar to those illustrated in FIG. 1.

In accordance with this example, the antimony trioxide passivating agent was discharged into the catalyst standpipe through an injection nozzle similar to that illustrated in FIG. 1. Specifically, the passivating agent was injected into a passivating agent inlet zone, of the novel injection nozzle, through a conduit having an inside diameter of ¼ inch, under a pressure ranging from about 70 p.s.i.a. to about 100 p.s.i.a. Moreover, the steam dispersing agent was injected into a dispersing agent inlet zone, of the injection nozzle, through a passage having an inside diameter of 1 inch, under a pressure ranging from about 50 p.s.i.a. to about 75 p.s.i.a. The dispersing agent was injected into the nozzle at a point before that at which the passivating agent was injected as illustrated in FIG. 1, so that the dispersing agent would contact the passivating agent only after the dispersing agent had reached its maximum discharge velocity.

When the dispersing agent contacted the passivating agent within the chambers of the nozzle, a dispersed passivating agent was formed and accelerated to its maximum discharge velocity. The dispersed passivating agent was discharged from the nozzles discharge end opening into the catalyst standpipe of the catalytic cracking unit under a pressure ranging from about 65 p.s.i.a. to about 100 p.s.i.a. The discharge end opening of the nozzle had an inside diameter of 1½ inches, After incorporating the novel injection nozzle of this invention, the anticipated problem of clogging if using a conventional injection method was not encountered. The injection process, using a nozzle similar to that illustrated in FIG. 1, has been effectively operating, virtually uninterrupted, for approximately ten months. In this ten-month period during which the novel injection nozzle has been used for dispersing the metals passivating agent into the catalyst standpipe, clogging problems occurred only when there were lapses in the operating conditions. For instance, in a few instances, the steam pressure was lost. When this occurred, the velocity at which the passivating agent was discharged into the catalyst standpipe decreased. This resulted in the chambers of the nozzle clogging almost immediately. This temporary malfunction illustrates the criticality of discharging the passivating agent at a high velocity.

From the results of this example, it is clear that using the novel injection nozzle of this invention provides a definite improvement to a conventional catalytic cracking unit wherein it is desirable to discharge a metals passivating agent into a high-temperature zone of a catalyiic cracking unit.

It is evident from the foregoing that various modifications can be made to the embodiments of this invention without departing from the spirit and scope thereof which will be apparent to those skilled in the art. Having thus described the invention, it is claimed as follows.

That which is claimed is:

1. In a process for the catalytic cracking of hydrocarbon feedstocks wherein an antimony-containing metals passivating agent is discharged through a sidewall of a catalytic cracking unit having a hydrocarbon cracking zone and a catalyst regeneration zone, the improvement comprises contacting said antimony-containing metals passivating agent with a dispersing agent within a nozzle having an inside wall surface defining a chamber, wherein said chamber has an upstream end portion and a downstream end portion, wherein said chamber downstream end portion has a discharge end portion which opens into said catalytic cracking unit sidewall and discharges a dispersed antimony-containing metals passivating agent into said catalyst regeneration zone of said catalytic cracking unit, wherein the temperature within said catalyst regeneration zone exceeds the melting point of said antimony-containing metals passivating agent, comprising the steps of:

introducing said dispersing agent into said chamber upstream end portion through a dispersing agent introduction means having an injection end portion which opens into said chamber upstream end portion;

introducing said antimony-containing metals passivating agent into said chamber upstream end portion through a metals passivating agent introduction means having an injection end portion which opens into said chamber upstream end portion at a point downstream of said dispersing agent introduction means discharge end portion.

2. A process as recited in claim 1 wherein said metals passivating agent introduction means is generally perpendicular to said dispersing agent introduction means.

3. A process as recited in claim 1 wherein said dispersing agent is introduced through said dispersing agent injection means injection end portion having an inside wall surface which defines an opening having an inside diameter ranging from about ¼ inch to about 1½ inches.

4. A process as recited in claim 3 wherein said dispersing agent is introduced under a pressure ranging from about 30 p.s.i.a. to about 150 p.s.i.a.

5. A process as recited in claim 1 wherein said metals passivating agent is introduced through said metals passivating agent injection means injection end portion having an inside wall surface which defines an opening having an inside diameter ranging from about ⅛ inch to about ½ inches.

6. A process as recited in claim 5 wherein said metals passivating agent is introduced under a pressure ranging from about 20 p.s.i.a. to about 100 p.s.i.a.

7. A process as recited in claim 1 wherein said dispersed metals passivating agent is discharged through said sidewall of said catalytic cracking unit through a nozzle having an inside wall surface which defines an opening of said discharge end portion of said chamber downstream end portion having a diameter ranging from about ¾ inch to about 2½ inches.

8. A process as recited in claim 7 wherein said dispersed passivating agent is discharged through said sidewall of said cracking unit under a pressure ranging from about 20 p.s.i.a. to about 150 p.s.i.a.

9. A process as recited in claim 1 wherein the temperature range of said catalyst regeneration zone ranges from about 1000° F. to about 1500° F.

10. A process as recited in claim 1 wherein said metals passivating agent is selected from the group consisting of aqueous suspensions of antimony trioxide, aqueous suspensions of antimony pentoxide, solid antimony oxides and tris(hydroxyethylmercaptide).

11. A process as recited in claim 10 wherein said metals passivating agent comprises aqueous suspensions of antimony trioxide.

12. A process as recited in claim 1 wherein said dispersing agent is selected from the group consisting of inert gases, water, air, oil and steam.

13. A process as recited in claim 12 wherein said dispersing agent comprises steam.

14. A process as recited in claim 13 wherein said passivating agent comprises aqueous suspensions of antimony trioxide.

15. A process as recited in claim 1 wherein said catalyst regeneration zone includes all points between that at which the used cracking catalyst exits the hydrocarbon cracking reactor and that at which the hydrocarbon feedstock enters the catalytic cracking unit.

16. A process as recited in claim 1 wherein said catalyst regeneration zone is a catalyst regenerator.

17. A process as recited in claim 1 wherein said catalyst regeneration zone is a catalyst standpipe.

* * * * *